Jan. 11, 1949.   F. ERNY   2,458,900
FLAP OPERATING MEANS

Filed Aug. 10, 1942   4 Sheets-Sheet 1

INVENTOR
FRANK ERNY
BY *[signature]*
ATTORNEY

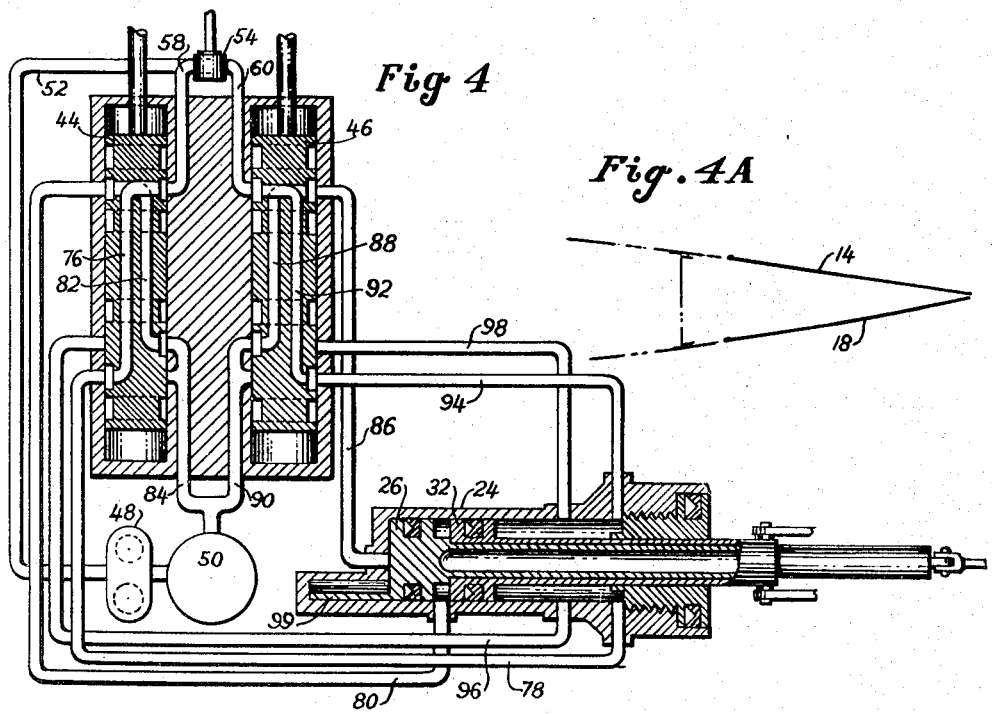
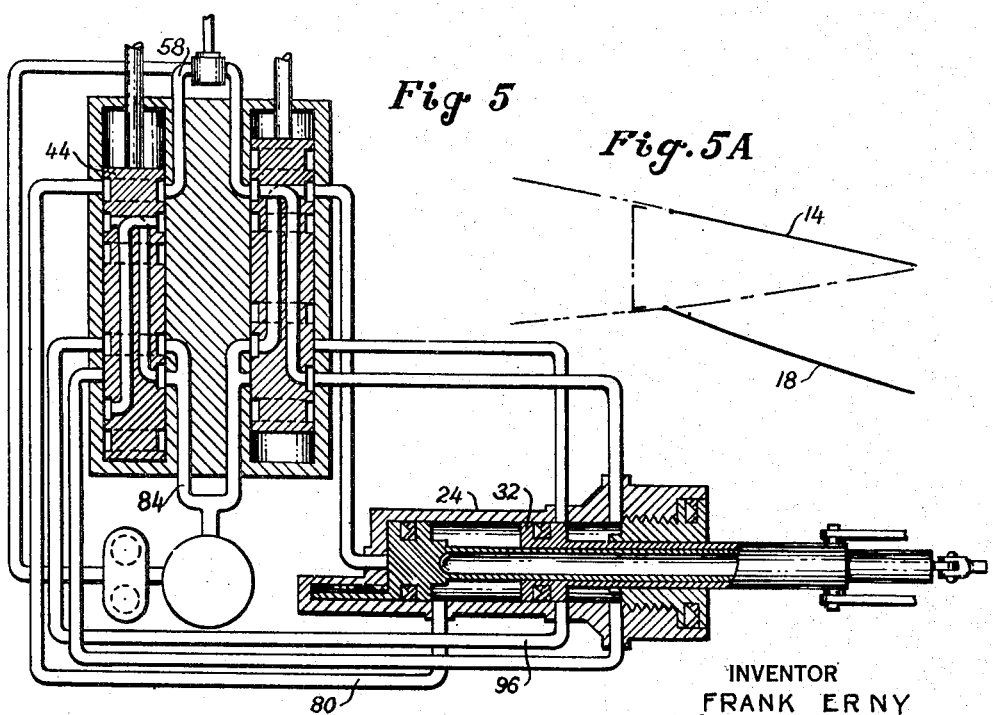

Jan. 11, 1949.                F. ERNY                2,458,900
                        FLAP OPERATING MEANS
Filed Aug. 10, 1942                            4 Sheets-Sheet 3
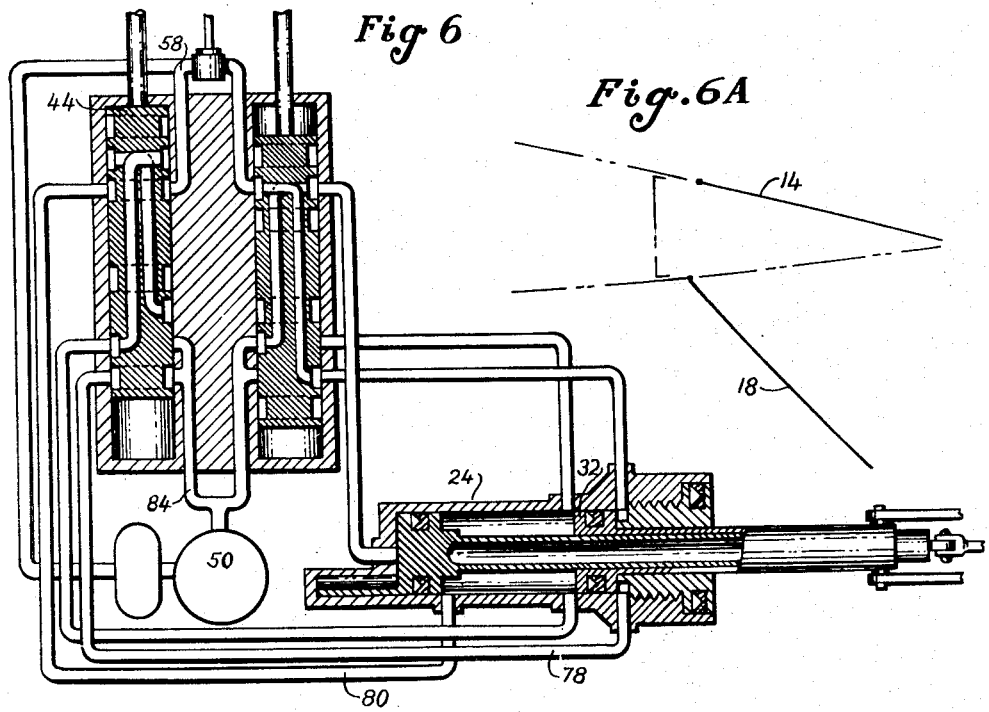
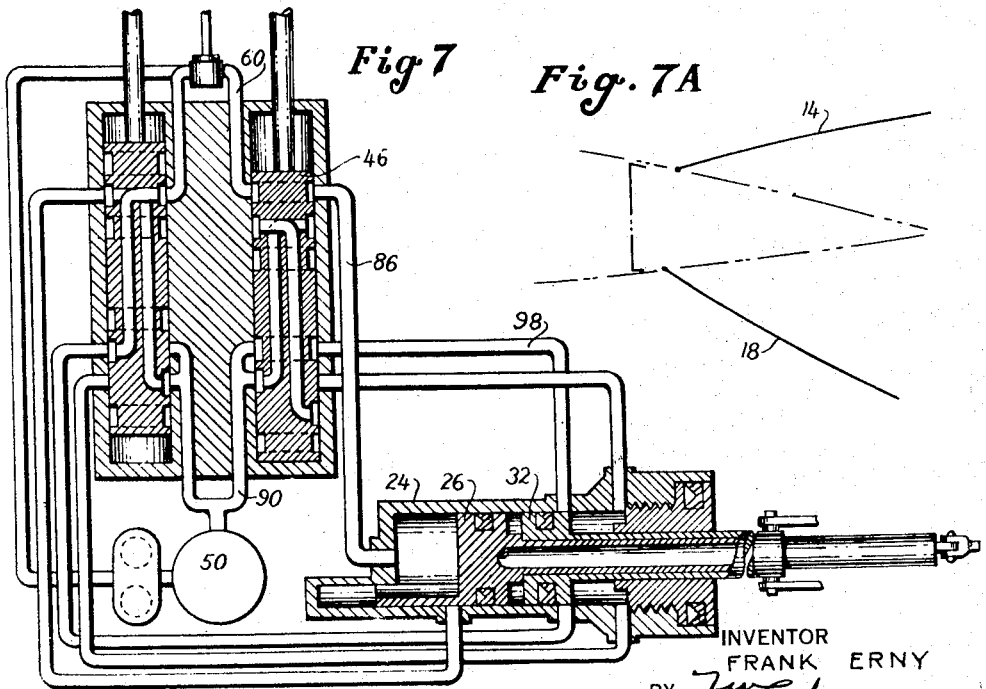
INVENTOR
FRANK ERNY
BY
ATTORNEY Jan. 11, 1949.   F. ERNY   2,458,900
FLAP OPERATING MEANS
Filed Aug. 10, 1942   4 Sheets-Sheet 4
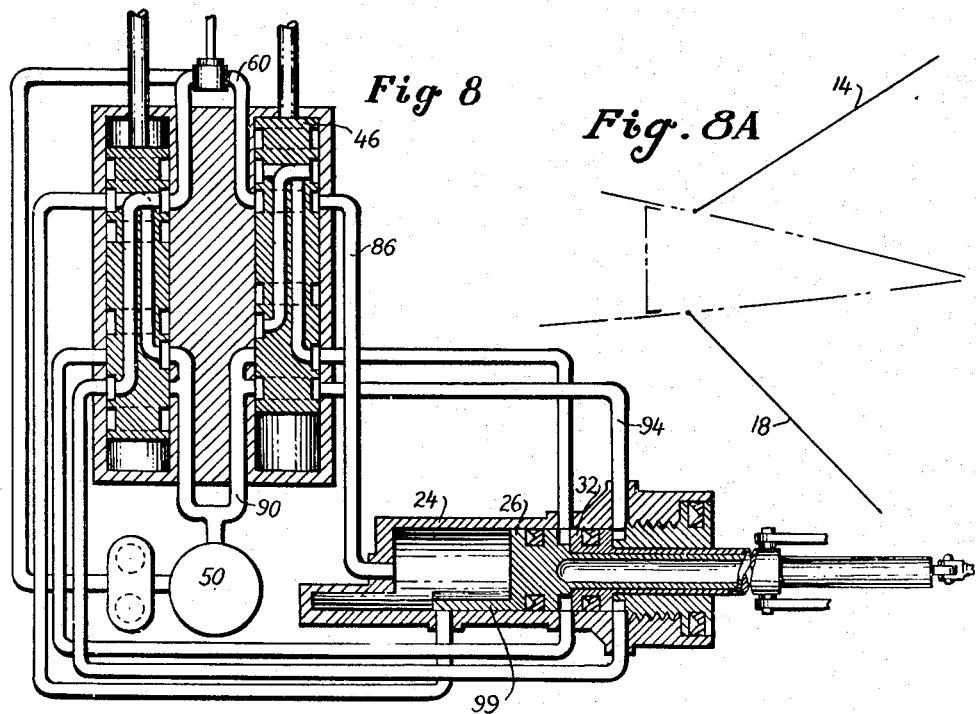
Fig 8
Fig. 8A
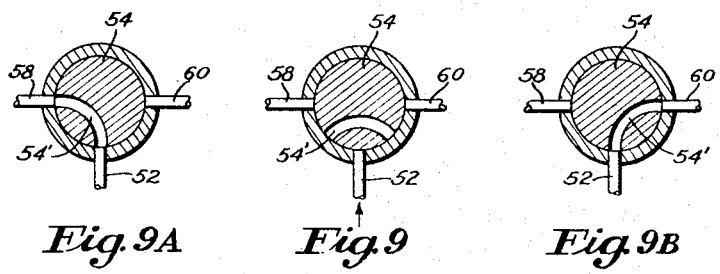
Fig. 9A   Fig. 9   Fig. 9B
INVENTOR
FRANK ERNY
BY
ATTORNEY Patented Jan. 11, 1949

2,458,900

UNITED STATES PATENT OFFICE 2,458,900

FLAP OPERATING MEANS

Frank Erny, Kenmore, N. Y., assignor to Curtiss-Wright Corporation, a corporation of Delaware Application August 10, 1942, Serial No. 454,345

1 Claim. (Cl. 60—97)

This invention relates to control means for split flaps on aircraft wings.

It is old in the art to utilize split flaps on the trailing edges of aircraft wings, as exemplified by Wright et al, Patent No. 1,504,663, and by Blaylock et al, Patent No. 2,137,382. In general, in an installation of this kind, there is one flap forming a continuation of the upper surface of the wing and another flap forming a continuation of the lower surface of the wing. These flaps, hinged adjacent the respective surfaces, may be moved oppositely to afford a high drag system for slowing down an aircraft in the diving attitude, or the lower flap may be moved downwardly either with or without the upper flap to form a joint drag and lift increasing means for the aircraft during landing and take-off maneuvers. Previous operating systems for split flaps have contemplated the use of separate controls and operating mechanism for each flap or, in some instances, the separate controls and more or less joint operating mechanism. The present invention contemplates the use of hydraulic motors for operating the split flaps, these motors being fed from a fluid pressure supply through a suitable valving system by which the different flap motions may be easily attained.

Objects of the invention are to provide a single hydraulic motor unit for operating split flaps either jointly or individually along with an appropriate valve system for selecting the flap movements desired and a unitary control means therefore; to provide a flap motor comprising a cylinder having jointly or individually operable pistons therein; to provide, broadly, hydraulic means for operating wing flaps; and to provide a readily operable valve system for selecting desired operating characteristics of wing flaps.

Further objects of the invention will become apparent in reading the annexed specification and claim in connection with the drawings, in which:

Figs. 4, 5, 6, 7, and 8 are longitudinal sections through the flap motor and valve system positioned for the flap adjustments schematically illustrated in Figs. 4A, 5A, 6A, 7A and 8A respectively; and Figures 9, 9A and 9B are schematic views of a valve, forming part of the system, in its mid and two extreme positions respectively.

Figure 1:
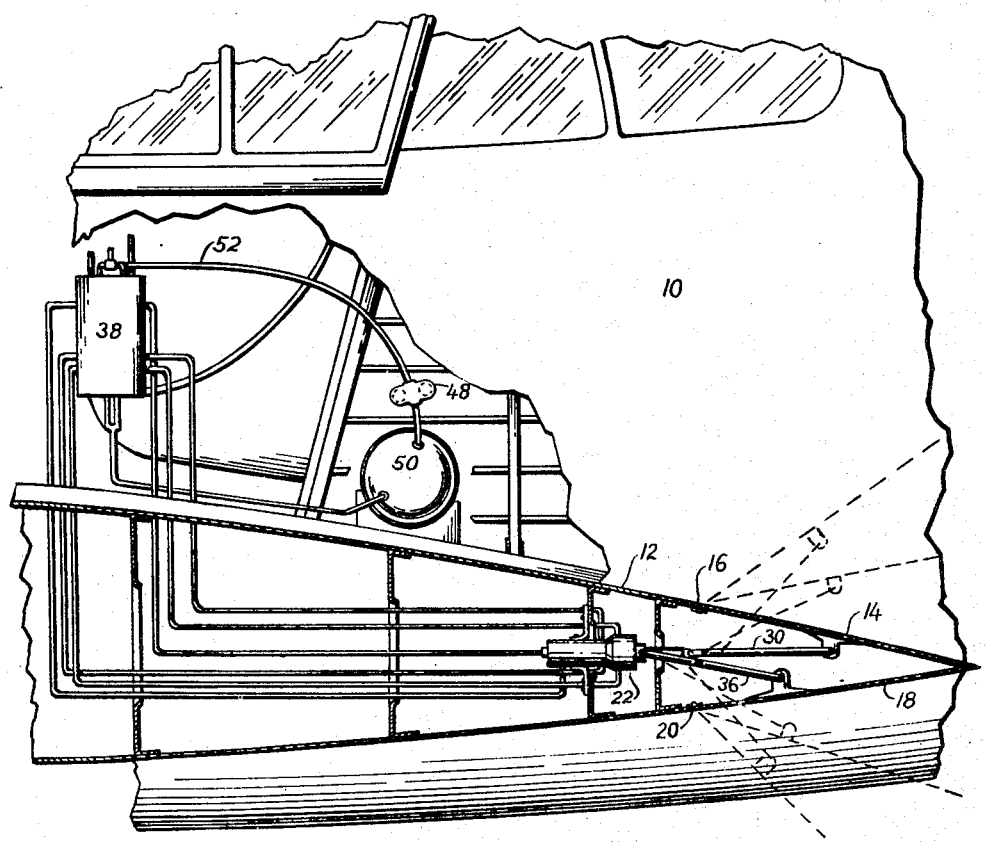
Fig. 1 is a fragmentary view of an aircraft fuselage, broken away to show the flap operating system.
Figure 2:
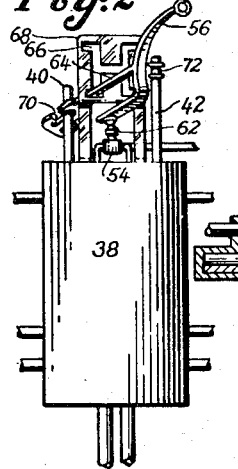
Fig. 2 is an enlarged side elevation of the valve system, showing the shifting handle.

Referring first to Fig. 1, the aircraft body 10 is provided with laterally extending wings, one of which is shown in section at 12. The trailing edge of each wing is formed by an upper flap 14 hinged to the top surface of the wing at 16, and a lower flap 18 hinged to the lower surface of the wing at 20. These flaps, as indicated by the dotted lines, may be moved respectively above and below the upper and lower surfaces of the wings from their neutral position, whereupon they comprise a drag device appropriate for slowing the airplane in a dive or any other attitude without imposing longitudinal turning moments upon the aircraft. Alternately, the lower flap 18 may be lowered below the lower wing surface from its neutral position, while the upper flap remains in the neutral position shown in solid lines, whereupon said flap 18 affords means for increasing wing lift and for increasing the drag to some extent. Lowering of the flap would be appropriate for landing and takeoff maneuvers of the aircraft.

Figure 3:
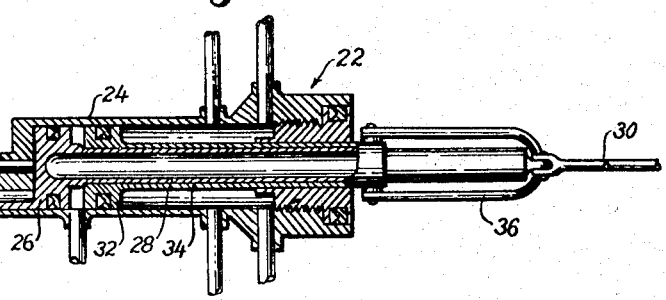
Fig. 3 is a longitudinal section through the flap operating motor, positioned for retraction of both of a pair of split flaps.

For operating the flaps, a hydraulic motor indicated in its entirety at 22 is used. This motor comprises a cylindrical housing 24 closed at its left end as shown in Fig. 3, and contains a piston 26 having a rod 28 extending through the right end of the cylinder and connected by a link 30 to the upper flap 14. A second piston 32 embraces the piston rod 28 and has a hollow rod 34 extending rightwardly from the cylinder 24 and connected by a partially forked link 36 to the lower flap 18. In addition, a plurality of conduits or tubing interconnect the motor 22 and a control valve assembly 38 to provide fluid pressure feed passages to and discharge passages from said motor in a manner hereinafter to be described.

The control valve assembly 38 is mounted within the aircraft body 10. The assembly is provided with two operating rods 40 and 42 respectively connected with valve plungers 44 and 46 vertically slidable in the valve housing and each working individually of the other. A pump 48 supplies fluid pressure from a reservoir 50 to the valve assembly through a conduit 52. A selection valve 54 in conduit 52 is under the control of a handle 56 to connect conduit 52 with either of the valves 44 or 46 through conduits 58 and 60 respectively. The valve 54 is schematically illustrated in Figures 9, 9A and 9B as comprising a movable valve plug having a passage 54'. In Figure 9, the valve is in its mid position in which the fluid supply in conduit 52 is shut off from either of the passages 58 and 60. Figure 9A illustrates the position of the valve 54 when the handle 56 is moved to the left, whereupon the fluid supply is connected from the conduit 52 to the conduit 58 and thence to the valve 44. Figure 9B illustrates the position of the valve 54 when the handle 56 is moved to the right, whereupon the fluid supply is connected from the conduit 52 to the conduit 60 and thence to the valve 60. The handle 56 is also provided with an offset bar 64 which extends through an H-shaped cutout 66 in a guide plate 68. The free end of the offset bar 64 is provided with opposed T-shaped cutouts 70. Each of the valve operating rods 40 and 42 is provided with two parallel circumferential ridges defining a neck portion 72 therebetween for reception within the T-shaped cutouts. When the valves 44 and 46 are in their neutral or mid position, their neck portions 72 are in the path of movement of the T cutouts on the bar 64 as this bar is moved along the horizontal portion of the H. Consequently, the handle 56 may be moved either to the left or to the right along the horizontal portion of the H to admit fluid to either of valves 44 or 46 and at the same time the neck portion 72, associated with the valve to which fluid is being admitted, will be received within the corresponding T cutout. In view of the swivel connection 62, the handle 56 then may be moved along the vertical path to raise or lower the particular valve 44 or 46 to which fluid is being admitted while the other valve remains stationary in its neutral position. The vertical portions of the H cooperate with bar 64 to guide the handle in these vertical movements. When the handle 56 is in the center of the horizontal portion of the H it will be disengaged from both valve operating rods 40 and 42 leaving them in their neutral position and the valve 54 may be arranged to then shut off the fluid pressure, as illustrated in Figure 9.

With both the valves 44 and 46 and the flaps 14 and 18 in their neutral or mid position, as seen in Figs. 4 and 4A, operation of valve 54 to admit fluid to either of valves 44 or 46, has no operative effect. If fluid is admitted to the valve 44, by moving the valve 54 to its position of Figure 9A, said fluid will pass through conduit 58, valve passage 76, and conduit 78 into the cylinder 24 to the right of pistons 26 and 32 thereby keeping the pistons to the left or moving them to the left if not already there, thereby positioning the flaps in the neutral position. Also, in this position of the valve 44, fluid is scavenged or discharged from the space between the pistons through conduit 80, valve passage 82, and conduit 84 into the reservoir 50. Similarly, fluid is scavenged or discharged from the extreme left end of the cylinder 24 through conduit 86, valve passage 88, and conduit 90 into the reservoir. If instead of admitting fluid to the valve 44 the fluid is admitted to valve 46, by moving the valve 54 to its position of Figure 9B, the scavenge passages will be the same as above but the fluid feed passage to the hydraulic motor cylinder 24 will now be through conduit 60, valve passage 92, and conduit 94.

If the handle 56 is operated to move the valve 54 to its position of Figure 9A to admit fluid to valve 44 and the handle is also operated to lower this valve, as in Fig. 5, then the fluid pressure will be connected to the hydraulic motor cylinder 24 by conduits 58 and 80 to the space between the pistons. The scavenge passage for the motor cylinder 24 will then be through conduits 86 and 84, all other scavenge passages being blocked. As a result, piston 32 will move to the right until it covers the scavenge passage 96, as illustrated in Fig. 5, thereby moving flap 18 to a partially deflected position as illustrated in Fig. 5A. To restore the flap 18 to its neutral position, the handle 56 is operated to restore valve 44 to its neutral position in which pressure fluid is admitted to the fluid motor cylinder 24 as described in connection with Fig. 4 to move the piston 32 to the left.

To move the lower flap 18 to its fully deflected position, the handle 56 is operated to move the valve 44 to its upper position, as illustrated in Fig. 6, thereby moving the valve 54 to its position of Figure 9A. Pressure fluid is then connected to the hydraulic motor cylinder 24 by conduits 58 and 80 to the space between the pistons. The scavenge passage for the motor cylinder is now through conduits 78 and 84. As a result, the fluid pressure moves the piston 32 through its full stroke to the right to position the flap 18 in its full-down position, as illustrated in Fig. 6A. The flap 18 may be returned to its neutral position by operating the handle 56 to return valve 44 to its neutral position, thereby returning piston 32 to the left as described above.

Fig. 7A illustrates the flaps 14 and 18 oppositely deflected from their neutral position to an intermediate position. To move the flaps to this position the handle 56 is operated to move valve 46 to its lower position, as illustrated in Fig. 7, thereby moving the valve 54 to its position of Figure 9B. In this position, fluid pressure is admitted to the left end of the hydraulic motor 24 through conduits 60 and 86 thereby moving both pistons to the right. Conduits 98 and 90 now provide a scavenge passage for the fluid into the reservoir 50. Therefore, the pistons will travel less than their full stroke and will stop when the conduit 98 is covered by the piston 32 since all other possible scavenge passages are blocked.

Fig. 8A illustrates the flaps oppositely deflected from their neutral position to their fully deflected position. To move the flaps to this position, the handle 56 is operated to move valve 46 to its upper position, as illustrated in Fig. 8, thereby also moving the valve 54 to its position of Figure 9B. Fluid pressure is then admitted to the left end of the cylinder 24 to conduits 60 and 86 while a scavenge passage is provided by conduits 94 and 90. Consequently, both pistons are moved through their full stroke. An extension 99 on the piston 26 serves to cover the cylinder opening into conduit 80, as illustrated in Fig. 8, to prevent the escape of fluid pressure directly into this conduit. In connection with both Figs. 7 and 8 when the valve 46 is returned to its neutral or mid position, the fluid connections will be as described in connection with Fig. 4 to move the pistons to the left and return the flaps to their neutral position.

Although only one hydraulic motor 22 has been illustrated, it will be understood that the valve assembly 38 will similarly control the fluid pressure to a similar hydraulic motor operatively connected to the split flaps of the oppositely extending wing.

From the above description, it will be apparent that applicant has provided a single hydraulic motor unit for operating the split flaps for effecting the desired flap movements and that all desired combinations of flap movements may be effected. It is never necessary in flight maneuvers to raise flap 12 independently of lowering flap 14.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In combination, fluid motor means for operating a pair of members said means including a cylinder, a pair of pistons in said cylinder each connected to one of said members, fluid passages communicating with the end and intermediate portions of said cylinder, and valve means controlling the admission of fluid under pressure to and the flow of fluid from said cylinder through said passages, said valve means being operable to admit fluid under pressure through one of said passages into said cylinder between said pistons when said pistons are adjacent one end of said cylinder and to permit the flow of fluid from said cylinder through either of two passages communicating respectively with the other end of said cylinder and with an intermediate portion of said cylinder such that full or partial stroke movement of only one of said pistons is effected, said valve means also being operable to admit fluid under pressure through one of said passages to one end of said cylinder and to permit the flow of fluid from said cylinder through either of two passages communicating respectively with the other end of said cylinder such that full or partial stroke movement of both said pistons is effected.

FRANK ERNY.

REFERENCES CITED

The following references are of record in the file of this patent:

UNITED STATES PATENTS

| Number | Name | Date |
| --- | --- | --- |
| 513,493 | Evered | Jan. 20, 1894 |
| 588,600 | Pelton | Aug. 24, 1897 |
| 1,004,541 | Martin | Sept. 26, 1911 |
| 1,046,529 | Winton | Dec. 10, 1912 |
| 2,234,009 | Robinson | Mar. 4, 1941 |
| 2,239,882 | Davis | Apr. 29, 1941 |
| 2,274,226 | Wiedmann | Feb. 24, 1942 |
| 2,279,615 | Bugatti | Apr. 14, 1942 |

FOREIGN PATENTS

| Number | Country | Date |
| --- | --- | --- |
| 679,260 | Germany | Aug. 1, 1939 |
| 118,919 | Austria | Sept. 10, 1930 |